United States Patent
Casati et al.

(10) Patent No.: US 9,438,436 B2
(45) Date of Patent: Sep. 6, 2016

(54) BROADCAST ANCHOR AVAILABILITY INDICATION

(75) Inventors: Alessio Casati, Swindon (GB); Sudeep Palat, Swindon (GB); Said Tatesh, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 2157 days.

(21) Appl. No.: 11/503,661

(22) Filed: Aug. 14, 2006

(65) Prior Publication Data
US 2008/0051025 A1 Feb. 28, 2008

(51) Int. Cl.
*H04L 12/56* (2006.01)
*H04L 12/18* (2006.01)

(52) U.S. Cl.
CPC ......... *H04L 12/1877* (2013.01); *H04L 12/189* (2013.01)

(58) Field of Classification Search
USPC ............ 370/216, 217, 221, 241, 241.1, 242, 370/245, 252, 312, 328, 331, 338, 351, 352, 370/357, 389, 390; 455/436, 453; 709/223–226
See application file for complete search history.

(56) References Cited

U.S. PATENT DOCUMENTS

| | | | |
|---|---|---|---|
| 6,701,155 B2 * | 3/2004 | Sarkkinen et al. | 455/515 |
| 6,754,250 B2 * | 6/2004 | Haartsen | 375/132 |
| 7,346,023 B2 * | 3/2008 | Chuah | 370/328 |
| 7,359,360 B2 * | 4/2008 | Ronneke | 370/338 |
| 7,423,993 B2 * | 9/2008 | Pasanen et al. | 370/331 |
| 7,499,437 B2 * | 3/2009 | Das et al. | 370/338 |
| 7,542,447 B2 * | 6/2009 | Ronneke et al. | 370/331 |
| 7,542,779 B2 * | 6/2009 | Halonen et al. | 455/552.1 |
| 7,606,572 B2 * | 10/2009 | Rhee et al. | 455/445 |
| 7,630,347 B2 * | 12/2009 | Kaminski et al. | 370/338 |
| 2003/0028644 A1 * | 2/2003 | Maguire et al. | 709/226 |
| 2003/0076803 A1 * | 4/2003 | Chuah | 370/338 |
| 2005/0078676 A1 | 4/2005 | Bae et al. | |
| 2006/0092872 A1 | 5/2006 | Lee et al. | |

FOREIGN PATENT DOCUMENTS

| | | |
|---|---|---|
| EP | 1282321 A2 | 2/2003 |
| WO | 03001830 A1 | 1/2003 |
| WO | WO 03/001830 * | 1/2003 ............ H04Q 7/24 |

OTHER PUBLICATIONS

3rd Generation Partnership Project (3GPP), Technical Specification (TS) Group Radio Access Network; UTRAN Overall Description 3GPP TS 25.401 V3.10.0; 2002; pp. 1-38.*

(Continued)

*Primary Examiner* — Robert C Scheibel
(74) *Attorney, Agent, or Firm* — Carlson, Gaskey & Olds, P.C.

(57) ABSTRACT

A multicast status availability indication from an anchor (24) is provided to a plurality of base nodes (22) that are part of a multicast group serviced by the anchor (24). The availability status indication in one example is sent autonomously by the anchor (24) independent of any inquiry or attempted setup of a new session with that anchor by a base mode (22). The base modes (22) maintain a candidate anchor set that includes information regarding currently available anchors for establishing new sessions, for example.

4 Claims, 2 Drawing Sheets

(56) References Cited

OTHER PUBLICATIONS

Bos et al.; "Toward an ALL-IP-Based UMTS system Architecture"; IEEE Network; Jan./Feb. 2001; pp. 36-45.*

Koodli et al.; "Supporting Packet-Data QOS in Next-Generation Cellular Networks"; IEEE Communications Magazine; Feb. 2001; pp. 180-188.*

International Search Report and Written Opinion of the International Searching Authority for International application No. PCT/US2007/017104 mailed Dec. 27, 2007.

Cain, B., et al., "Internet Group Management Protocol, Version 3," RFC 3376, Internet Engineering Task Force, Oct. 2002, XP015009135.

International Preliminary Report on Patentability for International application No. PCT/US2007/017104 mailed Dec. 30, 2008.

* cited by examiner

BROADCAST ANCHOR AVAILABILITY INDICATION

FIELD OF THE INVENTION

This invention generally relates to communications.

DESCRIPTION OF THE RELATED ART

A variety of communication systems are known. Many wireless communication systems are considered cellular systems because a plurality of base stations are deployed to provide coverage over geographic regions or cells. Mobile stations, for example, communicate with the base stations, which provide access to an associated network to facilitate communications on behalf of the mobile stations. In many examples, a radio network controller serves as an interface between the base station and the network.

There are times when one or more portions of a communication system may become unavailable. In 3GPP systems, for example, SGSN pools may be used. A SGSN will signal its non-availability to a radio network controller that has the ability to connect to it using RANAP protocol specified in 3GPP TS 25.413, for example. The SGSN may provide an overload indication, for example. Because the number of SGSNs and radio network controllers that can connect to them is relatively small, this approach works in conventional 3GPP systems.

There are communication system arrangements, however, where such an approach is not sufficient. In some communication systems there is no radio network controller and base station controller capabilities are distributed among base nodes. It is possible for a base node to select from among a number of potential anchors. This approach is used, for example, in so-called flat IP cellular systems. In the event that an anchor becomes overloaded or is otherwise out of service, the only known way for a base node to determine that is to attempt a connection with that anchor and fail or to receive a notice from the anchor responsive to the attempted connection that the anchor is unavailable to accommodate a new session with that base node. This approach introduces undesirable bearer set up latency. Additionally, this approach does not scale and requires a long time before the affected base nodes are sequentially notified regarding the unavailability of that anchor.

There is a need for an arrangement to facilitate more efficient connections between base nodes and anchors in communication systems. This invention addresses that need.

SUMMARY OF THE INVENTION

An exemplary method of communicating includes using a broadcast availability status indication from an anchor provided to a plurality of base nodes for configuring a set of candidate anchors that are currently available.

In one example, the broadcast status indication indicates that an anchor is one of available or unavailable.

In one example, an anchor broadcasts the status indication independent of an inquiry from a base node attempting to establish a connection with the anchor.

In one example, an anchor broadcasts the status indication on a periodic basis at regularly spaced intervals. In one example, when an anchor status changes, that anchor broadcasts a status indication as soon as possible responsive to the status change rather than waiting for the next regularly scheduled status indication.

In one example, a base node receives a status indication and responsively makes any necessary corresponding changes to a set of candidate anchors maintained by the base station. In one example, each base station automatically updates a status of candidate anchors responsive to received broadcast status indications.

The various features and advantages of this invention will become apparent to those skilled in the art from the following detailed description. The drawings that accompany the detailed description can be briefly described as follows.

DETAILED DESCRIPTION

Disclosed example embodiments of this invention demonstrate how using a broadcast anchor status indication that is broadcast by an anchor to a plurality of base nodes allows for configuring a candidate anchor set that includes status information of at least one candidate anchor. Such an approach allows for a scalable, automated configuration of available candidate anchor sets in communication systems such as flat Internet Protocol cellular systems.

Figure 1:
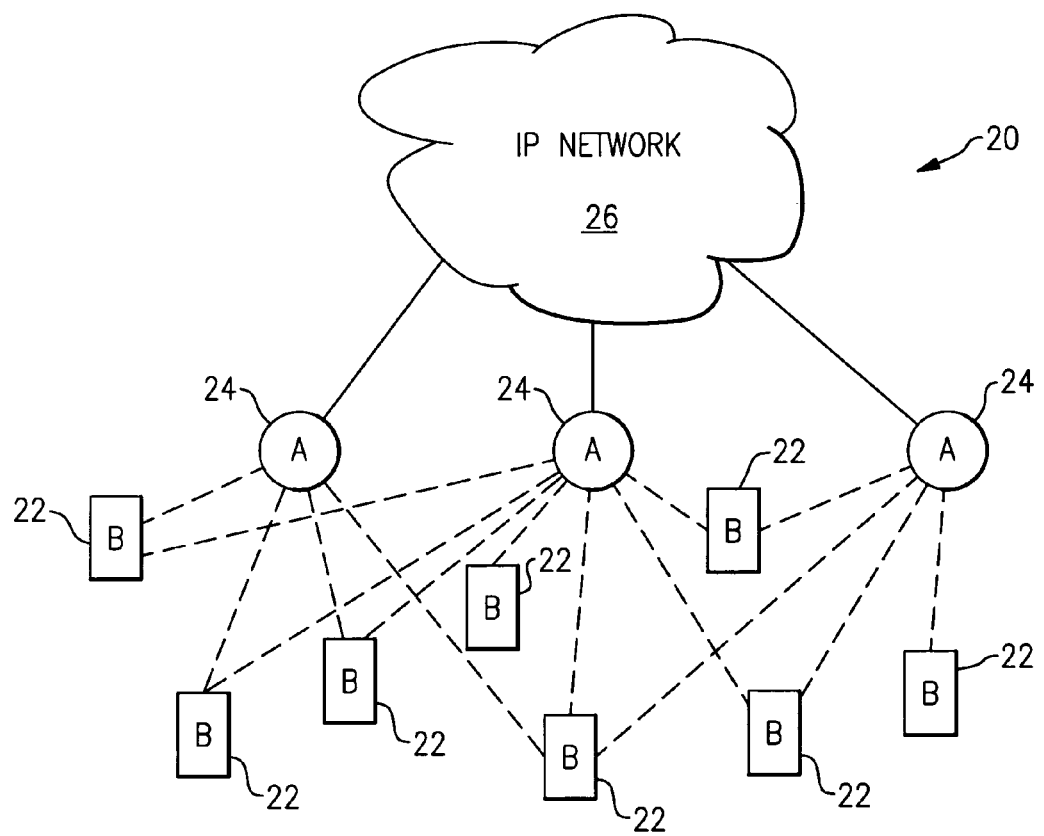
FIG. 1 schematically illustrates selected portions of an example communication system that is useful with an embodiment of this invention.

FIG. 1 schematically illustrates selected portions of an example communication system 20. A plurality of base nodes 22 facilitate communications on behalf of individual user devices, for example. A variety of devices may be used as a base node 22. One example includes a base station used for wireless communications. Such a base node may be used for macrocell or picocell coverage, for example. Another example base node is a router device that operates as a base station for a relatively limited or dedicated coverage area such as within a particular building. Another example base node is a server for a local area network. At least some of the base nodes 22 facilitate wireless communications between the base node and an end user device such as a mobile station or a computer.

The example of FIG. 1 also includes a plurality of anchors 24. A variety of anchor devices can be used depending on the needs of a particular situation. In some examples at least one base node acts as an anchor some of the time. Each of the anchors 24 has the ability to communicate with a plurality of the base nodes 22. In one example, the communication between the anchors 24 and the base nodes 22 occurs over an Internet Protocol (IP) network 26. Each anchor 24 provides an availability status indication to a plurality of the base nodes 22 indicating whether that anchor is available for establishing new sessions or unavailable because the anchor is already overloaded, is out of service or is subject to a maintenance procedure, for example. One example includes broadcasting the availability status indication to a plurality of the base nodes for configuring a candidate anchor set at each base node that includes an indication of currently available anchors. The term "broadcasting" as used in this description is intended to cover broadcast and multicast techniques.

The example availability status indication is different than a message from an anchor transmitted to a particular base node responsive to an inquiry or attempt by that base node to establish a connection with that anchor. The availability status indication is autonomously sent out by each anchor 24 independent of attempted access by base nodes or inquiries directly from a base node. Such an approach allows for scalability and automated or self-configuration of a candidate anchor set at each base node 22. Additionally, such an approach allows for more efficient overload status detection and reduces latency in bearer setup, at least in part, because a base node can predetermine whether an anchor is available before attempting to establish a connection through that anchor.

Figure 2:
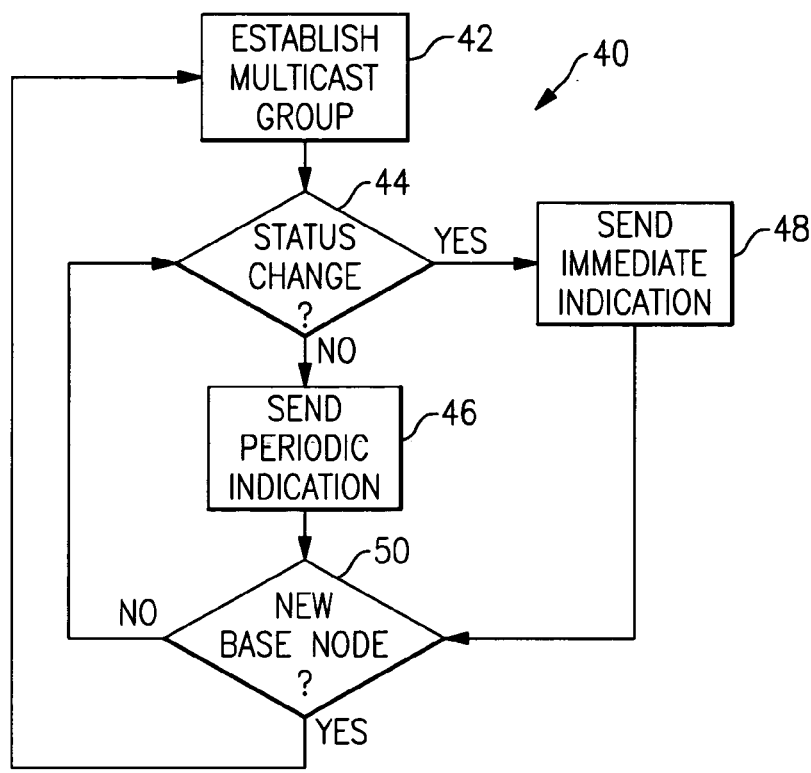
FIG. 2 is a flowchart diagram summarizing one example approach.

FIG. 2 includes a flowchart diagram 40 summarizing one example approach taken by an example anchor 24. At 42, the anchor 24 has an established multi-cast group. This is useful in an example where a multi-casting internet protocol is used by an anchor having internet routing capabilities for broadcasting the availability status indication. In one example, the multi-cast group includes IP addresses of each base node 22 with which an anchor is supposed to communicate the availability status indication. In one example, any base node 22 that has the possibility of connecting with an anchor 24 for purposes of establishing a session will be included in that anchor's multicast group. In most examples, the base nodes 22 will explicitly join a multicast group. One technique includes using an IMGPv3 join message. Given this description, those skilled in the art can determine how best to arrange a multicast group and to facilitate including base nodes in a multicast group to meet their particular needs.

At 44, the anchor 24 determines whether there has been a change in its current status. For example, when an anchor 24 is currently available for new sessions, a determination is made whether the anchor has become unavailable because of an overload condition, for example. If there is no change from its current status, the anchor 24 in the example of FIG. 2 sends a periodic availability status indication according to a preset schedule having regular intervals between the broadcast availability status indications. This occurs at 46 in the example of FIG. 2.

In the event that there is a status change at an anchor 24, the step at 48 is taken to send an immediate indication of the new availability status to provide information to the various base nodes 22 as soon as possible regarding the change in status of that anchor 24. In one example, the immediate notification of the status change preempts the regularly scheduled interval for sending availability status indication.

In one example, when the anchor is available, a first scheduled interval between availability status indications is used. When the anchor is unavailable, a second, smaller interval between indications is used to facilitate providing information regarding an unavailable anchor as soon as possible to any base nodes that have not already received an indication that the particular anchor is unavailable. This may occur, for example, when a new base node is added to a multicast group.

The example of FIG. 2 includes a decision at 50 whether any new base nodes 22 have been added to the multicast group of an anchor 24. If so, the multicast group is updated and the anchor continues sending the availability status indications as described above.

In one example, the availability status indication from an anchor includes current status information. In another example, at least one availability status indication provides information regarding a preselected or scheduled time during which the anchor will not be available. This may occur, for example, during a scheduled maintenance procedure. One example embodiment includes configuring a status indication to provide information regarding a particular anchor being unavailable at a future time. In such an example, the base nodes 22 maintain such information in association with the candidate anchor set for maintaining an indication that a particular anchor is unavailable at such a time. Such an approach allows for even more flexibility when selecting an anchor for establishing a new session even when an anchor is currently available but may very soon become unavailable.

Figure 3:
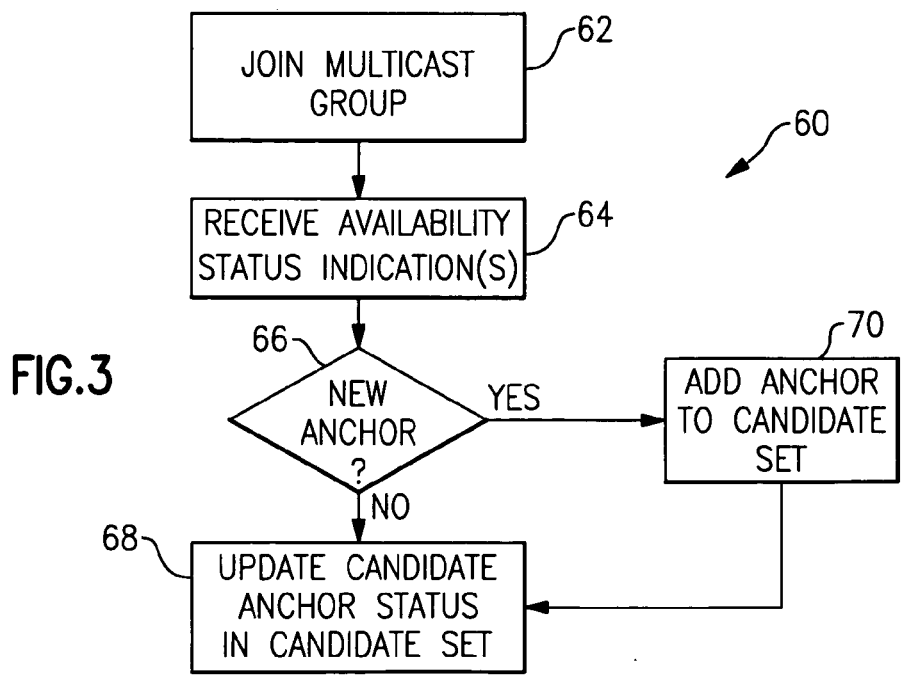
FIG. 3 is a flowchart diagram summarizing another example approach.

FIG. 3 includes a flowchart diagram 60 summarizing an example approach used by a base node 22. Each base node maintains a candidate anchor set as a look up table or database. At 62, the base node joins a multicast group. This occurs in one example by having an appropriate IP address configured into a base node 22 so that it will be included as part of a multicast group to which availability status indications are provided by at least one anchor with which that base node may establish a connection. Once a base node 22 is part of a multicast group, it begins receiving status indications from any anchor or anchors 24 that provide status indications to that multicast group. In some examples, a base node 22 will be a member of more than one multicast group, each of which may include one or more anchors 24.

At 64, the base node 22 receives a status indication from a particular anchor 24. At 66, the base node determines whether that is a current candidate anchor. If so, at 68, the base node determines the current status of that anchor. At 70, the base node updates the current status to indicate whether that anchor is available or unavailable. The step at 70 may include changing the status or maintaining the status based upon a previously received availability status indication.

The example of FIG. 3 also includes a step at 72 where the base node determines that it is receiving an availability status indication for the first time from an anchor 24. In this example, the base node adds the anchor to the candidate set and then proceeds to maintain an appropriate status of that anchor in the set. The base node uses the candidate anchor set information for purposes of selecting an anchor for establishing a new session, for example.

Having multicast or broadcast status indication information from the anchors 24 available for the base nodes 22 facilitates more efficient connections between the base nodes 22 and the anchors 24 for establishing new sessions, for example. With the disclosed examples, there no longer is a need for a base node 22 to attempt to establish a connection with an anchor 24 that is not currently available. Instead, the base nodes 22 are able to select anchors 24 that are currently available.

One example includes using a data origin authentication and integrity protection technique to protect the broadcast availability status indications and to ensure reliable information useful by the base nodes 22 for purposes of configuring their candidate anchor sets.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of communicating, comprising the steps of:
providing a flat architecture Internet Protocol cellular communication system in which base nodes have base station controller capability and there are no radio network controllers (RNCs); and
using a broadcast availability status indication from an anchor that is distinct from a RNC to a plurality of base nodes for self-configuring a candidate anchor set at each of the base nodes, each candidate anchor set including currently available anchors for the corresponding base node, each of the base nodes being configured to communicate with the anchor and configured to communicate directly with an end user device, the anchor being configured to communicate with the base nodes and a network such that the anchor is an interface between the base nodes and the network;

wherein the availability status indication comprises an indication that the anchor is unavailable.

2. A method of communicating, comprising the steps of:

providing a flat architecture Internet Protocol cellular communication system in which base nodes have base station controller capability and there are no radio network controllers (RNCs); and using a broadcast availability status indication from an anchor that is distinct from a RNC to a plurality of base nodes for self-configuring a candidate anchor set at each of the base nodes, each candidate anchor set including currently available anchors for the corresponding base node, each of the base nodes being configured to communicate with the anchor and configured to communicate directly with an end user device, the anchor being configured to communicate with the base nodes and a network such that the anchor is an interface between the base nodes and the network;

broadcasting the availability status indication periodically at each of a plurality of times spaced by a regular interval; and broadcasting the availability status indication at another time responsive to a change in the availability of the anchor.

3. A method of communicating, comprising the steps of:

providing a flat architecture Internet Protocol cellular communication system in which base nodes have base station controller capability and there are no radio network controllers (RNCs); and using a broadcast availability status indication from an anchor that is distinct from a RNC to a plurality of base nodes for self-configuring a candidate anchor set at each of the base nodes, each candidate anchor set including currently available anchors for the corresponding base node, each of the base nodes being configured to communicate with the anchor and configured to communicate directly with an end user device, the anchor being configured to communicate with the base nodes and a network such that the anchor is an interface between the base nodes and the network;

wherein the availability status indication includes information regarding a future time when the anchor will become unavailable.

4. A communication system having a decentralized architecture, comprising a plurality of base nodes, each being configured for communicating with an end user device, the base nodes being part of a flat architecture Internet Protocol cellular communication system in which the base nodes have base station controller capability and there are no radio network controllers (RNCs); and at least one anchor that is distinct from a RNC, the at least one anchor communicates with the plurality of base nodes and communicates with a network such that the at least one anchor is an interface between the base nodes and the network, the at least one anchor broadcasts an availability status indication to the plurality of base nodes, each of the plurality of base nodes self-configuring a candidate anchor set at each of the base nodes responsive to receiving the broadcast availability status indication, each candidate anchor set including currently available anchors for the corresponding base node;

wherein the availability status indication includes information regarding a future time when the at least one anchor will become unavailable.

* * * * *